United States Patent [19]

May et al.

[11] Patent Number: 5,849,056
[45] Date of Patent: Dec. 15, 1998

[54] ELECTRICALLY ACTIVATED FLEXIBLE PRESS FOR SHAPING HEAT SOFTENABLE SHEET MATERIAL

[75] Inventors: Earl L. May, Irwin; Hobart E. Kenton, Cabot; Robert G. Frank, Sarver, all of Pa.

[73] Assignee: PPG Industries, Inc., Pittsburgh, Pa.

[21] Appl. No.: 569,547

[22] Filed: Dec. 11, 1995

[51] Int. Cl.⁶ .......................... C03B 11/06; C03B 23/03
[52] U.S. Cl. .............................. 65/106; 65/273; 65/275; 65/287; 65/291; 264/313; 425/394
[58] Field of Search .................... 65/29.1, 29.11, 65/106, 107, 160, 273, 275, 287, 289, 290, 291, 102; 264/2.2, 2.4, 544, 547, 553, 313, 339; 72/380; 425/385, 394, 397

[56] References Cited

U.S. PATENT DOCUMENTS

| | | | |
|---|---|---|---|
| 2,297,315 | 9/1942 | Owen | 65/287 |
| 3,106,464 | 10/1963 | Dammers | 65/291 |
| 3,251,672 | 5/1966 | Touvay et al. | 65/291 |
| 3,501,281 | 3/1970 | Mattimoe et al. | 65/102 |
| 4,496,386 | 1/1985 | Hymore et al. | 65/106 |
| 4,501,603 | 2/1985 | Frank et al. | 65/106 |
| 4,579,577 | 4/1986 | Claasen | 65/273 |
| 4,741,751 | 5/1988 | Claassen et al. | 65/106 |
| 4,746,348 | 5/1988 | Frank | 65/291 |
| 4,822,398 | 4/1989 | McMaster et al. | 65/106 |
| 4,830,650 | 5/1989 | Kelly | 65/106 |
| 4,883,527 | 11/1989 | McMaster et al. | 65/106 |
| 4,892,574 | 1/1990 | Cortes | 65/291 |
| 4,909,819 | 3/1990 | McMaster et al. | 65/106 |
| 4,909,824 | 3/1990 | McMaster et al. | 65/106 |
| 4,957,531 | 9/1990 | McMaster et al. | 65/273 |
| 4,983,204 | 1/1991 | Borer et al. | 65/273 |
| 5,045,103 | 9/1991 | McMaster et al. | 65/273 |
| 5,059,233 | 10/1991 | Miihkinen et al. | 65/106 |
| 5,090,986 | 2/1992 | Zalesak | 65/106 |
| 5,118,335 | 6/1992 | Claassen et al. | 65/288 |
| 5,286,271 | 2/1994 | Reuter | 65/106 |
| 5,401,286 | 3/1995 | Goolsbay | 65/106 |
| 5,472,470 | 12/1995 | Kormanyos et al. | 65/287 |

FOREIGN PATENT DOCUMENTS

| | | |
|---|---|---|
| 0 261 611 | 3/1988 | European Pat. Off. . |
| 2693184 | 1/1994 | France . |
| WO89/01458 | 2/1989 | WIPO . |

OTHER PUBLICATIONS

PPG Industries, Inc. U.S. application No. 08/654,321, Robert G. Frank, et al., filed Sep. 14, 1995, entitled "Flexible Press".

*Primary Examiner*—Steven P. Griffin
*Attorney, Agent, or Firm*—A. C. Siminerio

[57] ABSTRACT

The present invention provides a shaping mold for shaping heat softenable sheet material which includes a flexible rail having a sheet shaping surface to support a marginal edge portion of a sheet to be shaped and a plurality of controllable actuators secured to the rail and capable of deforming the rail to provide its surface with configurations each having a desired elevational contour. In one particular embodiment of the invention, the shaping rail is a shaping ring having a peripheral configuration which provides generally continuous support about the marginal edge portion of the sheet. A controller is used to control each actuator and deform the sheet shaping surface of the ring from a first configuration having a generally flat elevational contour to a second configuration having an elevational contour that generally corresponds to the final desired contour of the marginal edge portion of the sheet.

18 Claims, 4 Drawing Sheets

ELECTRICALLY ACTIVATED FLEXIBLE PRESS FOR SHAPING HEAT SOFTENABLE SHEET MATERIAL

BACKGROUND OF THE INVENTION

This invention relates to shaping heat softened sheet material, and in particular to shaping heat softened glass sheets between an upper mold and a lower flexible ring mold.

Shaped and tempered glass sheets are widely used as windows in vehicles such as automobiles and the like. To fabricate these windows, flat glass sheets must be shaped to precisely defined curvatures dictated by the shape and outline of the window frame openings in the vehicle. It is important that the windows meet stringent optical requirements and be free of optical defects that would tend to interfere with clear viewing through the window.

Commercial production of shaped glass sheets commonly includes the steps of serially conveying the glass sheets through a tunnel-type furnace where they are heated to their heat deformation temperature and thereafter conveying the heat softened sheets into a shaping station where they are shaped by pressing each sheet between a pair of vertically aligned, upper and lower shaping molds. After shaping, the molds separate with the shaped glass sheet remaining secured to the upper mold by vacuum. A transfer ring having an outline and shape conforming to the desired curvature of the glass sheet slightly inboard of its perimeter, moves beneath the upper mold which thereafter releases the vacuum and deposits the shaped glass sheet on the ring. The ring then transfers the shaped glass sheet into a cooling station for controlled cooling.

The lower mold in such sheet shaping arrangement may include a rigid shaping ring as disclosed in U.S. Pat. No. 4,496,386 to Hymore et al. or a flexible shaping ring as disclosed in U.S. Pat. No. 4,830,650 to Kelly and 5,401,286 to Goolsbay et al. During shaping, the lower mold moves upward from a position below the conveying surface of the conveying rolls to lift the glass sheet off the rolls and into engagement with the upper mold. Each of these shaping arrangements has certain shortcomings. When using a rigid ring, since the ring has an elevational configuration generally corresponding to the final desired peripheral shape of the glass sheet, the ring does not simultaneously contact the entire marginal edge of the glass sheet as it initially lifts the sheet off the conveyor rolls. Rather, the rigid ring progressively engages the marginal edge with the higher points of the ring contacting the ring first. As a result, the glass may slide along the sheet engaging surface of the ring as the glass is shaped. When using a flexible ring mold, the ring has a flat configuration when it initially engages the glass sheet so that the entire marginal edge of the sheet is contacted simultaneously by the ring as the ring lifts the sheet off the conveyor rolls. However, as the glass is pressed against the upper mold, the pressure applied by the flexible ring depends on the member used to maintain the ring in an undeformed configuration. For example, in a ring as disclosed in U.S. Pat. No. 4,830,650, the pressing force depends on the spring constants of the springs which support the flexible ring. In addition, the deformation of the glass sheet is controlled by the pressing action of the flexible ring against the upper mold.

It would be advantageous to provide an arrangement whereby the lower mold engages marginal edge portion of a glass sheet to be shaped along at least a portion of the periphery of the glass sheet and controllably deforms to shape and subsequently press the marginal edge of the sheet against an upper shaping mold to ensure that the configuration of the pressed marginal edge portion conforms to the shape of the upper mold.

SUMMARY OF THE INVENTION

The present invention provides a shaping mold for shaping heat softenable sheet material which includes a flexible rail having a sheet shaping surface to support a marginal edge portion of a sheet to be shaped and a plurality of controllable actuators secured to the rail and capable of deforming the rail to provide its surface with configurations each having a desired elevational contour. In one particular embodiment of the invention, the shaping rail is a shaping ring having a peripheral configuration which provides generally continuous support about the marginal edge portion of said sheet. A controller is used to control each actuator and deform the sheet shaping surface of the ring from a first configuration having a generally flat elevational contour to a second configuration having an elevational contour that generally corresponds to the final desired contour of the marginal edge portion of the sheet.

The present invention also provides an apparatus for shaping heat softened sheet material including an upper mold, lower mold, transfer arrangement and actuators. The upper mold has a sheet shaping surface generally corresponding to a final desired contour of a sheet to be shaped. The lower mold has shaping rail with a flexible sheet engaging surface vertically aligned below the upper mold. The transfer arrangement transfers the sheet onto the shaping rail such that the sheet engaging surface of the shaping rail supports selected marginal edge portions of the sheet. The actuators are connected to the shaping rail and vertically reciprocate portions of the rail to controllably deform the sheet engaging surface of the lower mold and press the selected marginal edge portions of the sheet against corresponding portions of the sheet shaping surface of the upper mold. In one particular embodiment of the invention, the shaping rail is a peripheral shaping ring vertically aligned below the upper mold. The ring has a sheet engaging surface that supports the sheet about its periphery.

The present invention also provides a method of shaping heat softened sheet material which includes the steps of securing a plurality of actuators at selected positions along a shaping rail having a flexible sheet engaging surface, engaging selected marginal edge portions of a sheet to be shaped with the sheet engaging surface, moving the shaping rail and sheet toward an upper shaping mold having a contoured shaping surface generally corresponding to a final desired shape of the sheet, controlling the actuators to provide the sheet engaging surface of the rail with a generally flat configuration during the engaging step and alter the sheet engaging surface of the rail during at least a portion of the moving step from the flat configuration to a configuration having a curved elevational contour that generally conforms to a desired shape of the marginal edge portions of said sheet, and pressing the sheet against the upper mold sheet shaping surface. In one particular embodiment of the invention, the shaping rail is a shaping ring which extends around the periphery of the sheet to support and shape the entire marginal edge portion of the sheet.

DETAILED DESCRIPTION OF THE INVENTION

The present invention is taught in conjunction with its use in shaping heat softened glass sheets, but it is understood that the invention may be used in shaping any type of heat softened sheet material shaping arrangement.

Figure 1:
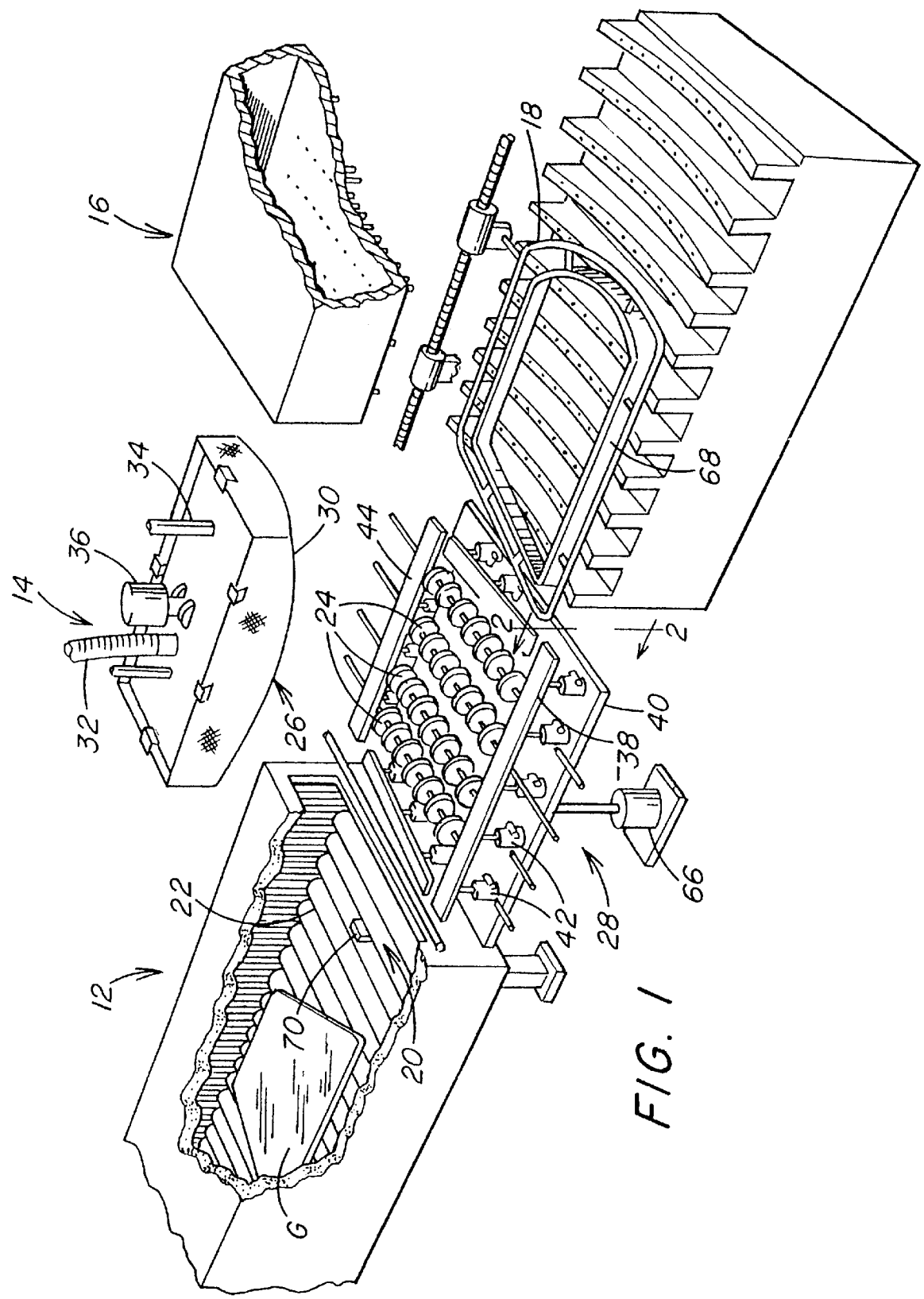
FIG. 1 is a partly fragmentary perspective view looking upstream at a glass sheet bending arrangement incorporating the teachings of the present invention.

Referring to FIG. 1, an apparatus for heating and shaping sheets of heat softened materials, such as glass, includes a furnace 12 through which glass sheets G are serially conveyed from a loading station (not shown) to heat each sheet to its deformation temperature, a shaping station 14 to shape the glass sheets, a cooling station 16 for cooling the shaped sheets, and an unloading zone (not shown) beyond the cooling station 16. Although not limiting in the present invention, the loading and unloading zones, furnace 12, shaping station 14 and cooling station 16 are aligned in end-to-end relation. A sheet transfer means 18 located at the cooling station 16 transfers the shaped glass sheet G between the shaping station 14 and cooling station 16.

The furnace 12 includes a horizontal conveyor 20 with longitudinally spaced, transversely extending conveyor rolls 22 that define a path of travel which extends through the furnace 12. The rolls 22 are arranged in sections and their rotational speed is controlled through clutches (not shown) so that the speed of each conveyor section may be controlled and synchronized in any convenient manner.

The shaping station 14 includes a series of spaced apart, donut shaped support rolls 24, an upper shaping mold 26 and a lower shaping mold 28, which is the subject of the present invention. Rolls 24 support the heat softened glass sheet G as it exits the furnace 12 and enters the shaping station 14. If desired, rolls 24 may be replaced with rolls that provide continuous transverse support of the sheet G within lower shaping mold 28.

Although not limiting in the present invention, the upper mold 26 is a vacuum mold, e.g. as disclosed in U.S. Pat. No. 4,579,577. The shaping surface 30 of the mold 26 generally conforms to the final desired shape of the glass sheet G. If desired, surface 30 may be covered with a heat resistant fabric (not shown), e.g. fiber glass or stainless steel cloth. With continued reference to FIG. 1, the upper vacuum mold 26, which communicates with a vacuum source (not shown) through an evacuation pipe 32 and suitable valve means (not shown), is connected through upper vertical guide rods 34 to a support frame (not shown) and is vertically moveable relative to the frame via a piston arrangement 36. The evacuation pipe 32 may be connected through a suitable valve arrangement to a source of pressurized air (not shown) which may be used to help separate the shaped sheet G from the mold 26.

The lower mold 28 includes a flexible shaping member 38 supported on a drive plate 40 by a plurality of actuators 42 which change its elevational contour. In the particular embodiment of the invention illustrated in FIGS. 1 and 2, the flexible member 38 is a deformable pressing ring having a peripheral outline that generally corresponds to the outline of the flat, heat softened glass sheet G prior to shaping. Unlike some bending rings which include fixed, rigid shaping surfaces that progressively contact a glass sheet to be shaped or rotate upward to engage and form the glass sheet, the sheet engaging surface 44 of the flexible ring 38 is altered by the actuators 42 during the sheet shaping operation to change the elevational contour from a first configuration to a second configuration. In particular, actuators 42 deform the ring 38 from a generally flat configuration when the ring 38 is positioned below the glass sheet G prior to shaping, to a curved configuration generally corresponding to the peripheral curvature of the upper mold 26 after the flexible ring 38 engages the marginal edge portion, 46 of a heat softened glass sheet G and presses the Sheet G against mold 26, as will be discussed later in more detail. In one particular embodiment of the invention, flexible ring 38 includes a flexible support 48 covered with a heat resistant cover 50. In the particular embodiment of the invention shown in FIG. 2, the heat resistant cover 50 is an insulating board secured to a flexible support 48 in a manner such that if required, as the ring 38 flexes during shaping, the support 48 and cover 50 may slide relative to each other. The combination of support 48 and cover 50 should be sufficiently rigid to support the heat softened glass sheet G as it is engaged by the lower mold 28, but also sufficiently flexible to deform and conform to the configuration of a corresponding portion of the upper is mold 26, as will be discussed later. In one particular embodiment of the invention, cover 50 is 0.125 inch (3.18 mm) thick Spauldite® ARK-2 aramid laminate available from Spaulding Fibre Co., Inc., New York and support 48 is 0.030 inch (0.76 mm) thick spring steel. If desired, additional heat resistant materials, such as fiberglass or metal press cloth (not shown), may be used to cover the ring 38. As an alternative, the cover 50 may be replaced with an insulating fabric. For example, the flexible ring 38 of lower mold 28 may include a 0.040 inch (1.02 mm) thick spring steel as support 48 with a NOR-FAB 1200 series sleeving as cover 50, available from Norfab Corp., Pennsylvania, secured to the upper surface of the support 48.

Figure 2:
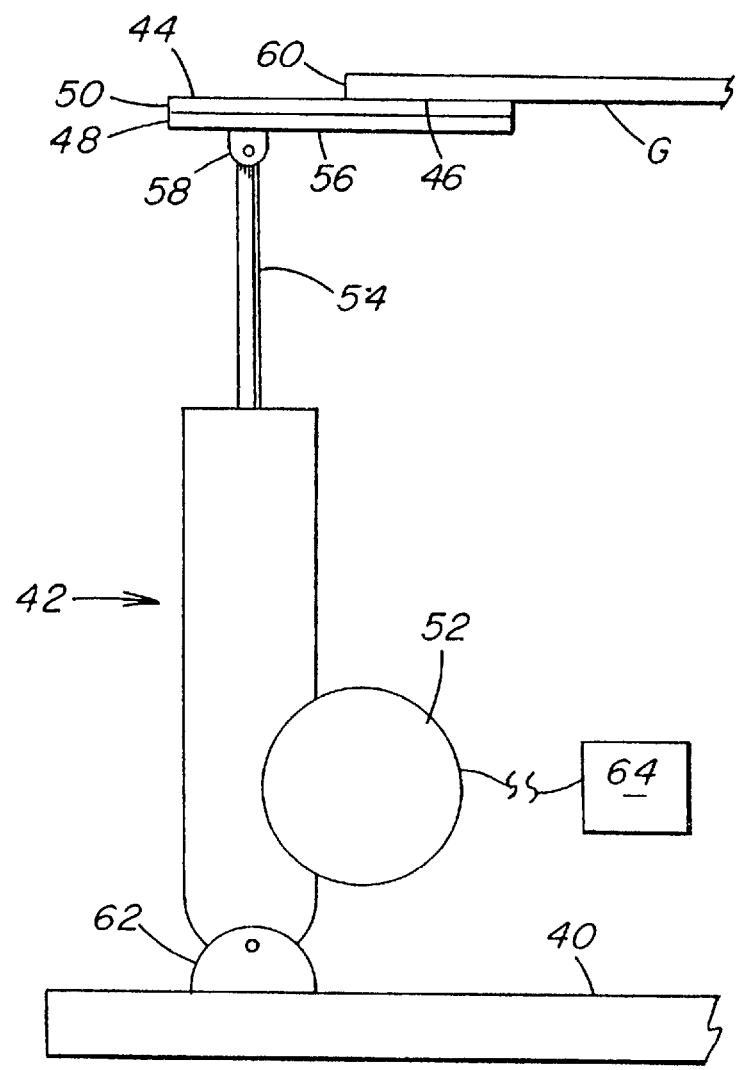
FIG. 2 is a view taken along line 2—2 of FIG. 1 illustrating the flexible shaping ring, actuators and drive plate of the present invention, with portions removed for clarity.

Each actuator 42 is an electrically controlled motor 52 that vertically reciprocates a rod 54 through a drive arrangement (not shown) such as, but not limited to a worm gear or ballscrew drive arrangement. The rod 54 is coupled to the lower surface 56 of flexible ring 38 using a connector arrangement 58 of a type that preferably allows the ring 38 to change its orientation, i.e. pivot and rotate along its transverse and longitudinal axes, e.g. a clevis, spring, ball and socket, universal joint or other compliant connector, such that the ring 38 may generally conform to the curvature of a corresponding peripheral portion of the upper mold 26. Although not limiting in the present invention, the connector arrangement 58 is preferably located outboard of the peripheral edge 60 of the glass sheet G, as shown in FIG. 2, so that as the glass sheet G is pressed against surface 30 of upper mold 26, as will be discussed later in more detail, and the force applied by the flexible ring 38 will be concentrated along the edge 60. In this manner, any marking of the glass sheet G along the marginal edge portion 46 due to contact with surface 44 of the flexible ring 38 will be minimized. In addition, although not limiting in the present invention, in the particular embodiment illustrated in FIGS. 2–6, each actuator 42 is secured to the drive plate 40 via a pinned connection 62 that allows the actuator 42 to rotate during the pressing and shaping operation, as will be discussed later in more detail. The length of the rod 54 for each actuator 42 depends on the final desired shape of the glass sheet G. In particular, the greater the bend in the glass sheet G, the more the actuator 42 must lift the marginal edge portion 46 of the glass sheet G to engage the surface 30 of upper mold 26. It should be appreciated that actuators 42 having different stroke lengths may be used at various positions along the flexible ring 38.

Each of the actuators 42 is connected to a controller 64 which controls the stroke, i.e. the amount of vertical movement, of each rod 54 via motors 52, the speed of the stroke and the pressure applied by each actuator 42 to shape the glass in a desired sequence, as will be discussed later in more detail. Since each actuator 42 is individually controlled by controller 64, stroke speed and distance and the applied pressure may be varied from actuator to actuator as well as varied for a particular actuator during the shaping and pressing operation. Although not limiting in the present invention, it is expected that each actuator 42 will be capable of vertically reciprocating rod 54 at a speed of at least about 5 inches per second (12.7 cm per second), preferably at least about 10 inches per second (25.4 cm per second), and applying a force of at least about 10 pounds (44.5 Newtons). One type of actuator 42 that may be used is an electrically driven linear actuator available from Parker Hannifin Corp., Rohnert Park, Calif., which includes a Parker Actuator ETB50-B02PA31 -CCA100-A Ballscrew driven actuator, a Parker Compumotor BLHX75BN servo drive and a Parker Compumotor ML3450B-10 motor.

The number and spacing of the actuators 42 depend on the final desired configuration of the sheet to be shaped and the amount of control over the deformation of the flexible ring 38 that is required. It is expected that the flexible ring 38 would be sufficiently rigid between adjacent actuators 42 so that any sag in the flexible ring 38 between adjacent actuators 42 would be minimal. However, if desired, additional deformable supports, for example as disclosed in U.S. Pat. No. 4,830,650, may be positioned between actuators 42 to provide any supplemental support to the ring 38.

It should be appreciated that although the preferred actuator includes an electrically controlled linear actuator, other types of drive systems may be used, e.g. pneumatic or hydraulic cylinders. However, these later types of systems are not as responsive as an electric drive arrangement. In particular, an electrically driven linear actuator provides superior speed and more precise control over the movement of the rods 54.

Figure 3:
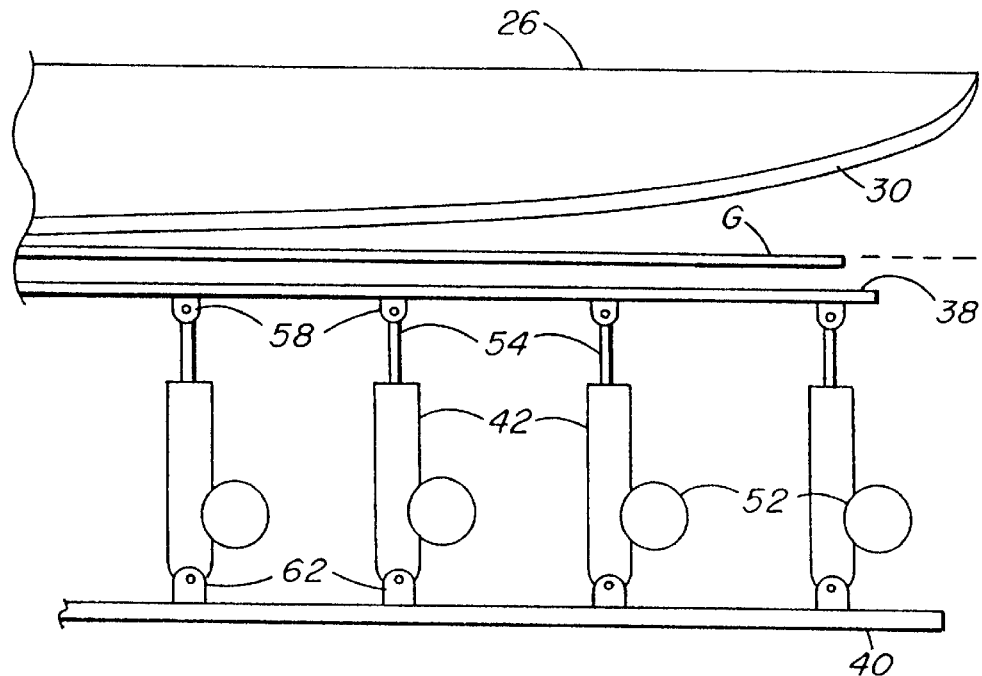
FIGS. 3–6 are schematic side elevational views illustrating the operation of the electrically actuated flexible shaping ring.
Figure 4:
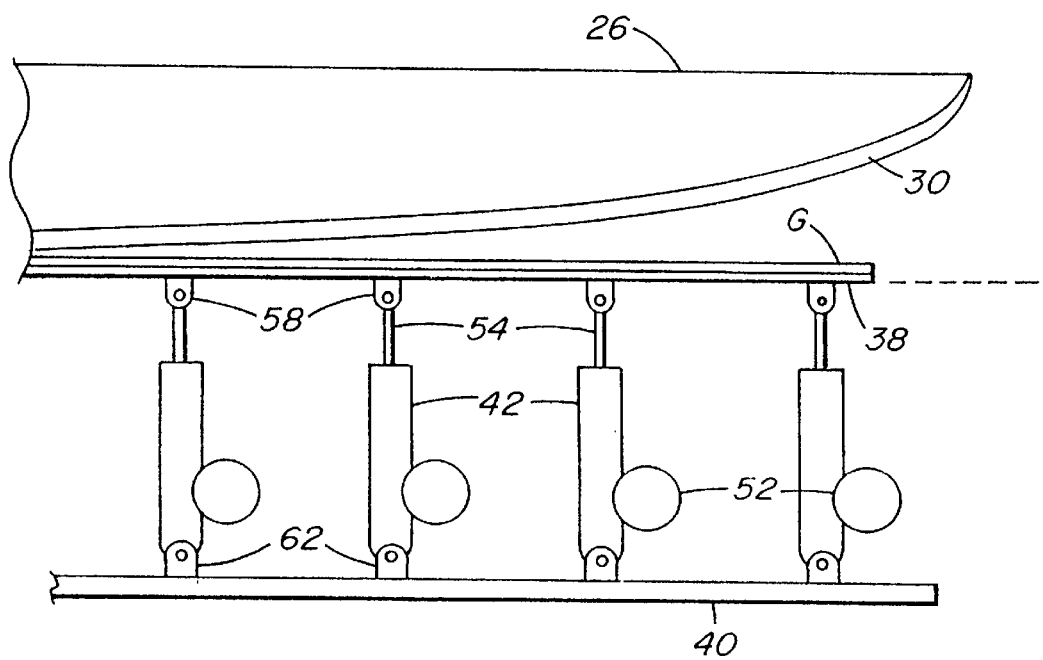
Figure 5:
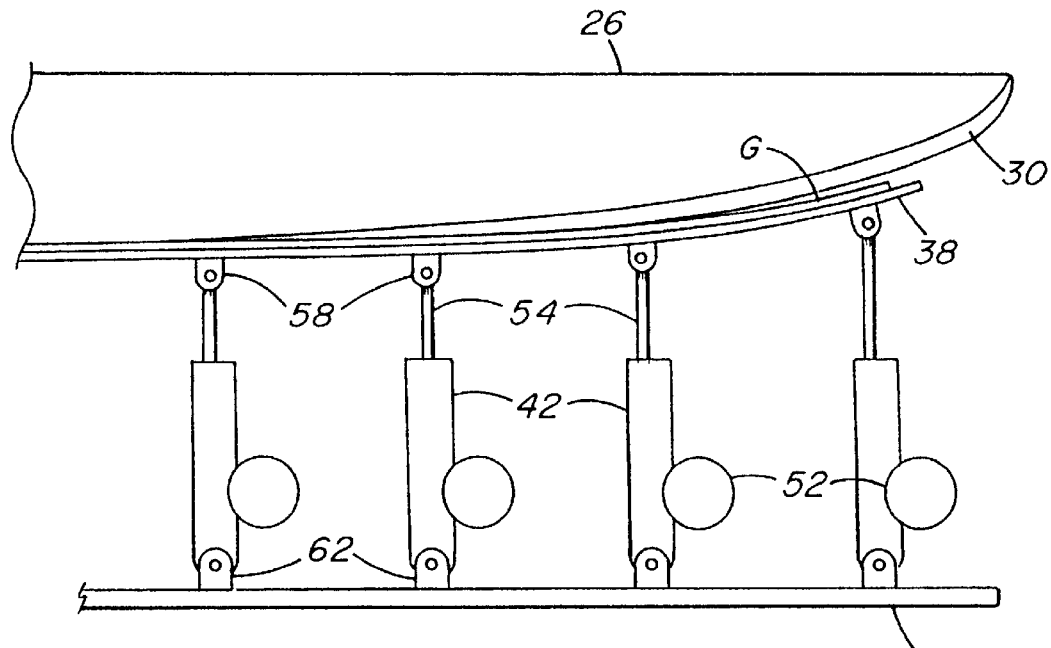
Figure 6:
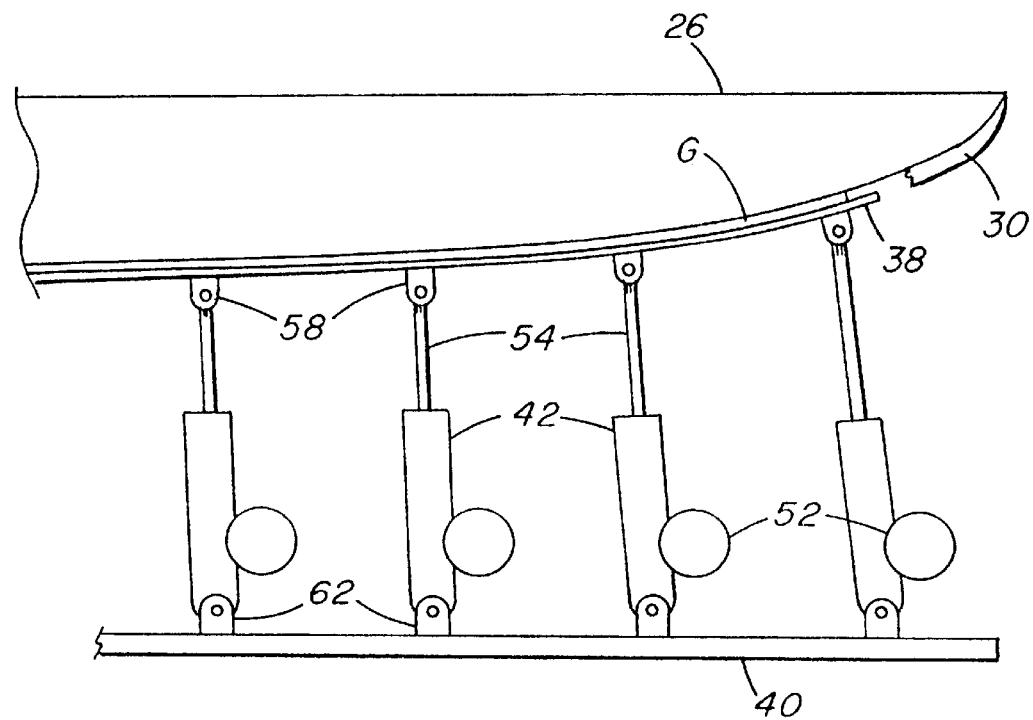

Drive plate 40 is secured to an elevator means, which is shown in FIG. 1 as lifting cylinder 66, to vertically reciprocate lower mold 28 from an initial position, wherein the flexible ring 38 is positioned below the support rolls 24 (shown only in FIG. 1) in the shaping station 14 as shown in FIG. 3, to a position above the support rolls 24 wherein the glass sheet G is lifted off the rolls 24 by flexible ring 38 as shown in FIG. 4, as will be discussed later in more detail. Although not required, it is preferred that when positioned below rolls 24, flexible ring 38 has a generally flat configuration. Depending on the mode of operation, cylinder 66 may raise drive plate 40 to lift the glass sheet G to a position in close proximity to the shaping surface 30 of upper mold 26 or may lift the sheet G such that portions of the sheet G which are unsupported by the flexible ring 38 contact the surface 30, as will be discussed later in more detail.

If desired, to prevent the ring 38 from deforming during its initial upward movement, such as rotation of the ring 38 as it engages and lifts the glass sheet G, lower mold 28 may be provided with an assembly (not shown) as disclosed in U.S. Pat. No. 5,401,286, which includes a plurality of posts which support ring 38 during the initial lifting of the glass sheet G and prevent undesired deformation.

Although not limiting in the present invention, in the particular embodiment illustrated in FIG. 1, sheet transfer means 18 includes a tempering ring 68 to transfer the shaped glass sheet G between the shaping station 14 and cooling station 16. It should be appreciated that other sheet transfer arrangements well known in the art may be used to remove the shaped sheet from the shaping station 14 and into the cooling station 16, e.g. as disclosed in U.S. Pat. No. 5,286,271 to Rueter et al.

Referring to FIGS. 3–6, in operation the glass sheet G is conveyed through the furnace 12 to heat the sheet G to its heat softening temperature. Sensor 70 senses the position of the glass sheet G and sends this information to controller 64 which controls the sheet shaping operation by initially controlling the conveying rates of rolls 22 in furnace 12 and rolls 24 in shaping station 14. It should be appreciated that if desired, a separate controller (not shown) may be used to control the conveying rates of rolls 22 and 24. As the glass sheet G exits the furnace 12 and is conveyed to shaping station 14, the flexible ring 38 of the lower mold 28 is positioned below the upper conveying surface of support rolls 24 so that the glass sheet G may be conveyed into the shaping station 14 on the rolls 24 without interference. Furthermore, actuators 42 are adjusted so that flexible ring 38 has a flat configuration when positioned below rolls 24. When the glass sheet G is in proper position between the upper mold 26 and the lower mold 28, the glass sheet G is transferred from the rolls 24 to the lower mold 28. In the particular embodiment of the invention illustrated in FIGS. 3–6, this transfer is accomplished by activating cylinder 66 (shown only in FIG. 1) to move lower mold 28 upward from its initial position below rolls 24, as shown in FIG. 3, to a raised position to contact the marginal edge portion 46 of the glass sheet G with flexible ring 38 and lift the glass sheet G off rolls 24, as shown in FIG. 4. Since actuators 42 shape the ring 38 to initially provide a flat sheet engaging surface 44, the ring 38 will simultaneously engage the entire marginal edge portion 46 of the sheet G. It should be appreciated that this transfer may also be accomplished by lowering rolls 24 to a position below ring 38, in any convenient manner known in the art, to deposit the glass sheet onto the lower mold 28.

After lifting the glass sheet G, cylinder 66 continues to move mold 28 upward to position the sheet G in close proximity to but spaced from the sheet shaping surface 30 of the upper mold 26, as shown in FIG. 4. Next, actuators 42 are individually energized by controller 64 to raise and press marginal edge portions 46 of the sheet G against corresponding portions of shaping surface 30. More specifically, in a predetermined sequence, actuators 42 drive rods 54 upward to alter the elevational contour of sheet engaging surface 44 by progressively deforming corresponding portions of the flexible ring 38. For example, as illustrated in the particular embodiment shown in FIGS. 5 and 6, all the actuators 42 lift the marginal edge portion 46 of the sheet G, with the actuators 42 supporting the central marginal edge portions of the sheet G, i.e. the actuators furthest to the left in FIG. 5, pressing the supported marginal edge portion 46 against surface 30 of upper mold 26. The remaining actuators 42 continue to lift the sheet G so that the marginal edge portion 46 is progressively pressed against the surface 30 (from left to right as viewed in FIGS. 5 and 6) to shape the sheet G. Connectors 58 at the ends of rods 54 of the actuators 42 and pinned lower connections 62 of the actuators 42 allow each actuator 42 to rotate as required and the flexible ring 38 to pivot and deform so that the sheet engaging surface 44 may conform to a configuration that generally compliments the corresponding peripheral portion of the mold 26. Vacuum is drawn along surface 30 during the pressing operation to further shape the interior portions of the glass sheet G and hold the sheet G against the mold 26 after shaping. If desired, an alignment arrangement, e.g. a post and receiver system (not shown) or other system known in the art, may be used in the shaping station 14 to ensure proper vertical alignment between the upper mold 26 and flexible ring 38.

After shaping, cylinder 66 moves the flexible ring 38 of lower mold 28 away from the shaped sheet G to a position below the rolls 24 and the actuators 42 return the flexible ring 38 to its flat configuration. As the flexible ring 38 is lowered, the shaped glass sheet G is held against the upper mold 26 by vacuum. Tempering ring 68 is then positioned beneath the upper vacuum mold 26 to receive the shaped glass sheet G. The vacuum is then terminated and the glass sheet G is deposited on the tempering ring 68 which thereafter conveys the shaped glass sheet G to the cooling station 16 where the glass sheet G is controllably cooled to a temperature below its strain point temperature to temper the glass.

As an alternative to the above shaping and pressing sequence, the cylinder 66 and actuators 42 may be coordinated to lift the sheet G and preliminarily shape the sheet G before it is pressed against surface 30 of upper mold 26. More specifically, after cylinder 66 has lifted the sheet G off rolls 24 and positioned it in close proximity to the surface 30, the actuators 42 which support those portions of the marginal edge portion 46 that require the greatest amount of vertical movement in order to contact surface 30, are energized. For example, to preliminarily shape a sheet G to a configuration as shown in FIGS. 3–6, the initially energized actuator 42 would be the actuator furthest to the right in FIG. 3. Actuators 42 would then be sequentially energized from right to left as viewed in FIG. 3 to progressively deform and preliminarily shape the glass sheet G so that at least the marginal edge portion 46 of the glass sheet G has a shaped configuration that approximates the final desired shape for that portion of the sheet. After the sheet G is preliminarily shaped, the actuators 42 continue to move the deformed flexible ring 38 upward until the heat softened sheet G is engaged by the shaping surface 30 of upper mold 26 and the marginal edge portion 46 of the sheet G is pressed against surface 30 by the lower mold 28. As an alternative, further deformation of ring 38 by actuators 42 may be terminated and cylinder 66 may be used to lift the ring 38 and finally press the preliminarily shaped sheet G against upper mold surface 30.

It should be appreciated that the movement of the lower mold 28 via cylinder 66 may be coordinated by controller 64 with the activation of the actuators 42 to shape the glass sheet G using sequences other than those discussed above. In particular, the actuators 42 may be energized and/or de-energized at any time prior to, during or after the movement of the flexible ring 38 by the cylinder 66 to perform any desired shaping and pressing sequence. For example, as discussed earlier, cylinder 66 may lift the flexible ring 38 so that it lifts the heat softened glass sheet G off the rolls 24 and into partial contact with surface 30 of the upper mold 26. The actuators 42 would thereafter deform the flexible ring 38 and press the marginal edge portion 46 of the sheet G against a corresponding portion of surface 30 of upper mold 26. As another example, selected actuators 42 may be energized during cylinder 66's lifting of the ring 38 and sheet G so that the sheet is being preliminarily shaped while it is still being lifted by the cylinder.

Although the lower mold 28 of the invention as discussed utilizes a flexible ring 38 that supports the marginal edge portion of the sheet G about its entire periphery, the ring 38 may be modified so that it is sectionalized into separate, spaced apart flexible shaping rails which engage only selected marginal edge portions of the sheet G. For example, the flexible ring 38 may be limited to engage and press only the outermost wing portions of a heat softened glass sheet, i.e. the portions of the sheet G furthest to the right in FIGS. 3–6. The remaining marginal edge portions may be lifted and pressed against upper mold 26 by a rigid shaping rail (not shown) having a fixed shape, or those remaining portions may remain unsupported and lifted into engagement with surface 30 of the upper mold 26 as the sheet G is raised by the flexible rails but they would not be positively pressed against the surface 30 as would be the wing portions.

It is also contemplated in the present invention that the need for lifting cylinder 66 may be eliminated. In particular, if the length of the stroke of actuator rods 54 is long enough, the actuator 42 may be used to initially lift the sheet G off the rolls 24 and preliminarily shape and/or press the sheet G against surface 30 of upper mold 26, using any desired operating sequence, such as but not limited to the operating sequences discussed above.

Other variations as would be known to those skilled in the art based on the disclosure herein may be resorted to without departing from the scope of the invention as defined by the claims that follow.

We claim:

1. A shaping mold for shaping heat softenable sheet material, comprising:
    a flexible rail with a sheet shaping surface to support marginal edge portions of a sheet to be shaped;
    a plurality of individually controllable actuators spaced along and secured to at least one section of said flexible rail; and
    a controller to operate said actuators and displace selected portions of said at least one section of said flexible rail in a desired direction so as to independently deform a portion of said sheet shaping surface of said flexible rail while supporting a heat softened sheet, from a first configuration having a generally flat elevational contour to a second configuration having a curved elevational contour.

2. The mold as in claim 1 wherein said actuators are electrically driven linear actuators.

3. The mold as in claim 1 wherein said flexible rail is a shaping ring having a peripheral configuration which provides generally continuous support about said marginal edge portions of said sheet to be shaped and further including additional controllable actuators secured to said shaping ring and controlled by said controller to displace selected portions of said shaping ring while supporting a heat softened sheet.

4. The mold as in claim 3 further including a support plate positioned below said flexible rail, wherein said actuators are mounted on said support plate and further including a lifter to vertically reciprocate said support plate, actuators and flexible rail.

5. The mold as in claim 1 wherein said actuators are secured to said flexible rail by connectors capable of permitting reorientation of said sheet shaping surface of said flexible rail relative to said actuators.

6. An apparatus for shaping heat softenable sheet material comprising:
    an upper mold having a sheet shaping surface generally corresponding to a final desired contour of a sheet to be shaped;

a lower shaping rail vertically aligned below said upper mold, said lower shaping rail having a flexible sheet engaging surface;

actuators connected to said lower shaping rail to vertically displace selected portions of said lower shaping rail and deform said sheet engaging surface;

means to support said sheet to be shaped between said upper mold and said lower shaping rail and position selected marginal edge portions of said sheet to be shaped above said lower shaping rail;

means to move said lower shaping rail from a first position below said means to support said sheet to be shaped and spaced from said sheet to be shaped, to a second position spaced from said upper mold, wherein said sheet engaging surface of said lower shaping rail contacts said selected marginal edge portions and supports said sheet to be shaped;

a controller to control said vertical displacement of said selected portions of said lower shaping rail by said actuators, wherein said controller controls said actuators to provide said sheet engaging surface with an essentially flat configuration when said lower shaping rail is at said first position and maintain said flat configuration of said sheet engaging surface when said lower shaping rail is moved to said second position and contacts said selected marginal edge portions of said sheet to be shaped, and said controller further controls said actuators to vertically displace said selected portions of said lower shaping rail while said lower shaping rail is spaced from said upper mold, to independently deform said sheet engaging surface from said flat configuration to a shaped configuration generally corresponding to a corresponding portion of said upper mold when said lower shaping rail is at said second position and in contact with said selected marginal edge portions of said sheet to be shaped; and means to subsequently move said lower shaping rail having said shaped configuration toward said upper mold to press said selected marginal edge portions of said sheet to be shaped against said sheet shaping surface of said upper mold.

7. The apparatus as in claim 6 wherein said lower shaping rail forms a peripheral shaping ring vertically aligned below said upper mold and said flexible sheet engaging surface of said shaping ring supports said sheet to be shaped about its periphery.

8. The apparatus as in claim 6 further including means to draw a vacuum along said sheet shaping surface of said upper mold.

9. The apparatus as in claim 8 further including a tempering ring and means to move said tempering ring between a first position beneath said upper mold to a second position spaced from said upper mold.

10. The apparatus as in claim 6 wherein said actuators provide said means to move said lower shaping rail from said first position to said second position and said means to subsequently move said lower shaping rail toward said upper mold.

11. A method of shaping heat softenable sheet material comprising:

securing a plurality of controllable actuators at selected positions along a shaping rail having a flexible sheet engaging surface;

engaging selected marginal edge portions of a sheet to be shaped with said flexible sheet engaging surface of said shaping rail to support said sheet;

moving said shaping rail and sheet to be shaped toward an upper shaping mold having a contoured shaping surface generally corresponding to a final desired shape of said sheet to be shaped;

controlling said actuators to initially provide said flexible sheet engaging surface of said shaping rail with a generally flat configuration during said engaging step and subsequently vertically displace various portions of said shaping rail in varying amounts at each actuator while supporting said sheet to be shaped, to alter said flexible sheet engaging surface of said shaping rail while said shaping rail is spaced from said upper mold, from said generally flat configuration to a curved configuration having a curved elevational contour that generally conforms to a desired shape of said marginal edge portions of said sheet to be shaped prior to said marginal edge portions contacting said contoured shaping surface of said upper shaping mold; and pressing said marginal edge portions of said sheet to be shaped into contact with said contoured shaping surface of said upper shaping mold, wherein said altering of said flexible sheet engaging surface of said shaping rail from said generally flat configuration to said curved configuration is performed prior to and independent of said marginal edge portions of said sheet to be shaped contacting said contoured shaping surface of said upper shaping mold during said pressing step.

12. The method as in claim 11 wherein said controlling step includes the step of individually controlling each of said actuators such that each of said actuators deforms a portion of said shaping rail at a predetermined speed and applies a predetermined pressure against said sheet.

13. The method as in claim 11 further including the steps of drawing a vacuum along said contoured shaping surface of said upper shaping mold while said sheet to be shaped is pressed into contact with said contoured shaping surface of said upper shaping mold, and subsequently lowering said shaping rail while holding said sheet to be shaped in contact with said contoured shaping surface of said upper shaping mold, discontinuing said vacuum to deposit said sheet to be shaped onto a shaped sheet support and moving said sheet to be shaped to a location removed from said upper shaping mold to controllably cool said sheet to be shaped.

14. The method as in claim 11 wherein said moving step positions said sheet to be shaped at least in close proximity to said contoured shaping surface of said upper shaping mold.

15. The method as in claim 11 wherein said moving step includes the step of controlling said actuators to engage and move said sheet to be shaped towards said upper shaping mold.

16. The method as in claim 11 wherein said pressing step includes the step of controlling said actuators to press said sheet to be shaped against said contoured shaping surface of said upper shaping mold.

17. The method as in claim 11 further including the step of mounting said actuators on a drive plate and said engaging step includes the step of lifting said drive plate to engage said sheet to be shaped with said shaping rail.

18. The method as in claim 11 wherein said shaping rail is a shaping ring and said engaging step engages said sheet to be shaped about its entire marginal edge portion and said pressing step presses said entire marginal edge portion into contact with said upper shaping mold.

* * * * *